US012179823B2

(12) United States Patent
George et al.

(10) Patent No.: US 12,179,823 B2
(45) Date of Patent: Dec. 31, 2024

(54) CARGO DEVICE

(71) Applicant: LEAR CORPORATION, Southfield, MI (US)

(72) Inventors: Gegi George, Farmington Hills, MI (US); Kyle Calvert, Sterling Heights, MI (US)

(73) Assignee: LEAR CORPORATION, Southfield, MI (US)

( * ) Notice: Subject to any disclaimer, the term of this patent is extended or adjusted under 35 U.S.C. 154(b) by 195 days.

(21) Appl. No.: 18/086,896

(22) Filed: Dec. 22, 2022

(65) Prior Publication Data

US 2024/0208558 A1 Jun. 27, 2024

(51) Int. Cl.
*B62B 5/04* (2006.01)
*B62B 3/02* (2006.01)
*B62B 5/00* (2006.01)
*B62B 3/00* (2006.01)

(52) U.S. Cl.
CPC .............. *B62B 5/0003* (2013.01); *B62B 3/02* (2013.01); *B62B 5/0495* (2013.01); *B62B 3/005* (2013.01)

(58) Field of Classification Search
CPC ..... B62B 5/0003; B62B 5/0495; B62B 5/049; B62B 3/02; B62B 3/005
See application file for complete search history.

(56) References Cited

U.S. PATENT DOCUMENTS

| | | | |
|---|---|---|---|
| 7,484,631 B2 | 2/2009 | Bothun | |
| 7,886,380 B2 * | 2/2011 | Hornbach | A47C 19/045 5/613 |
| 10,131,371 B2 | 11/2018 | Camarco et al. | |
| 11,198,519 B1 | 12/2021 | Seeley | |
| 11,554,943 B2 * | 1/2023 | Schwalbach | B66F 9/22 |
| 11,639,286 B2 * | 5/2023 | O'Connell | B60R 9/06 254/84 |
| 11,904,920 B2 * | 2/2024 | Bernal | B66F 7/0625 |
| 2006/0145461 A1 | 7/2006 | Anderson | |
| 2020/0048058 A1 | 2/2020 | Schwalbach et al. | |
| 2020/0255271 A1 | 8/2020 | O'Connell et al. | |

FOREIGN PATENT DOCUMENTS

CN 110227572 A * 9/2019

* cited by examiner

*Primary Examiner* — John D Walters
(74) *Attorney, Agent, or Firm* — Brooks Kushman P.C.

(57) ABSTRACT

A cargo device includes a cargo storage compartment defining a cavity for receiving cargo therein, a cassette mounted to the cargo storage compartment by a lifting feature, the cassette being movable via the lifting feature between a locked position engaging a track and an unlocked position disengaged from the track, and a latch mechanism operably connected to the cassette. The latch mechanism is movable between an engaged state securing the cargo storage compartment within a vehicle cargo space, and a disengaged state released from the vehicle cargo space. Upon the latch mechanism being in the engaged state, the lifting feature is actuated to move the cassette into the locked position.

20 Claims, 12 Drawing Sheets

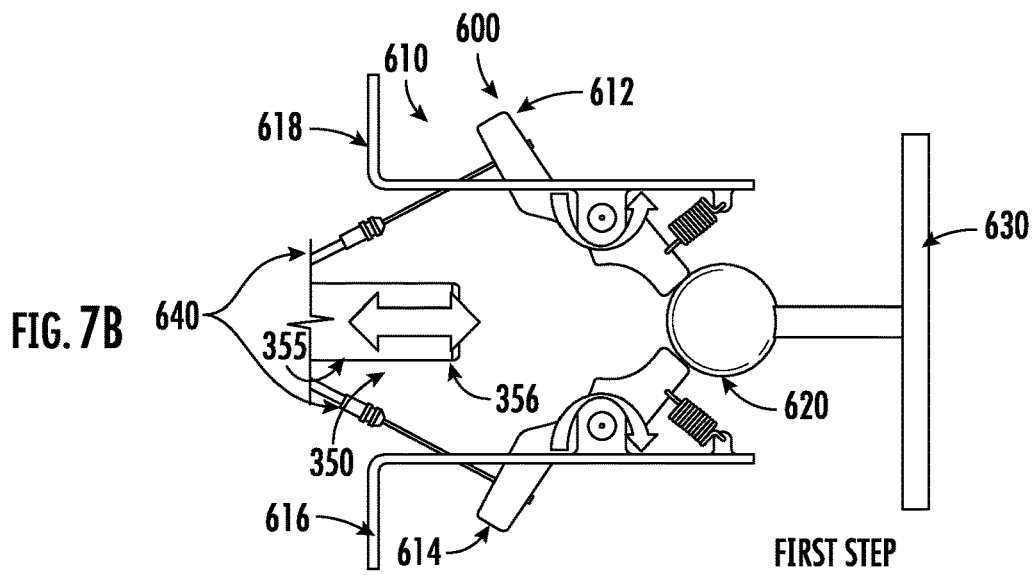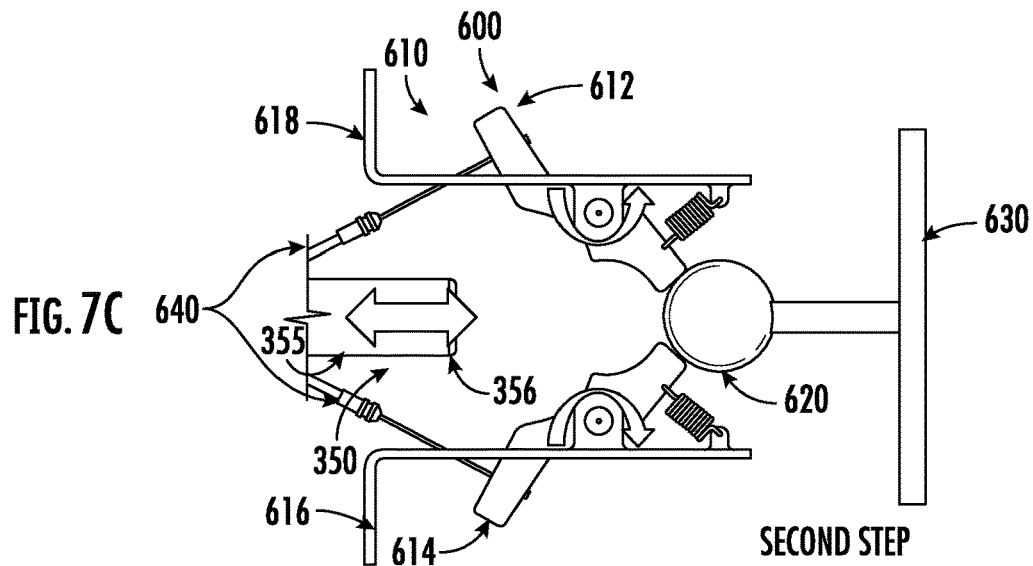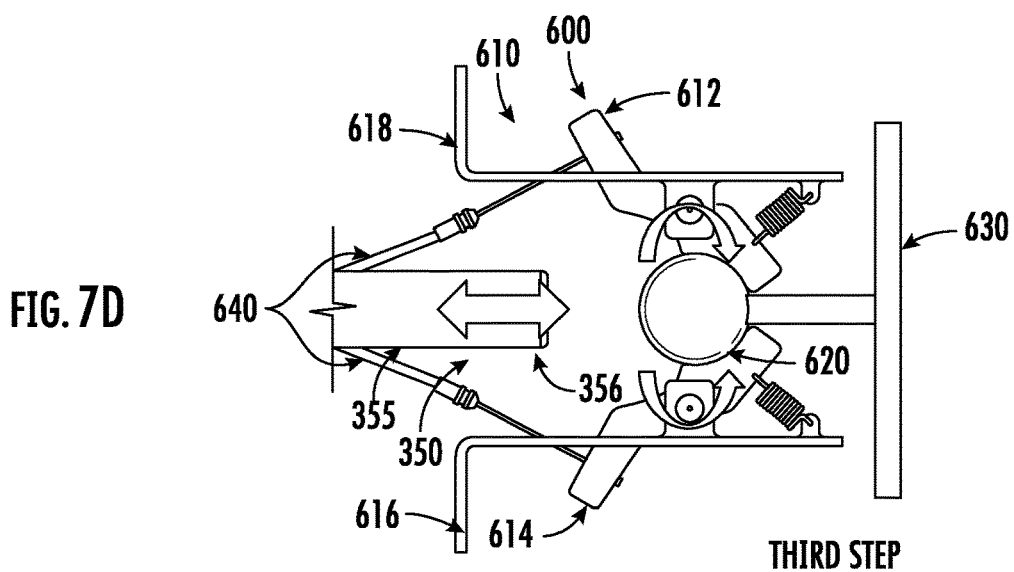

CARGO DEVICE

TECHNICAL FIELD

The present disclosure relates to a cargo device, and more particularly, to a latch system for a cargo device.

BRIEF DESCRIPTION OF THE DRAWINGS

FIG. 7B is a partial side view of the latch mechanism of FIG. 7A, with the latch unsecured and a slider mechanism in a first position;

FIG. 7C is a partial side view of the latch mechanism of FIG. 7B, with the latch secured and the slider mechanism in the first position;

FIG. 7D is a partial side view of the latch mechanism of FIG. 6B, with the latch secured and the slider mechanism in a second position;

DETAILED DESCRIPTION

Figure 1:
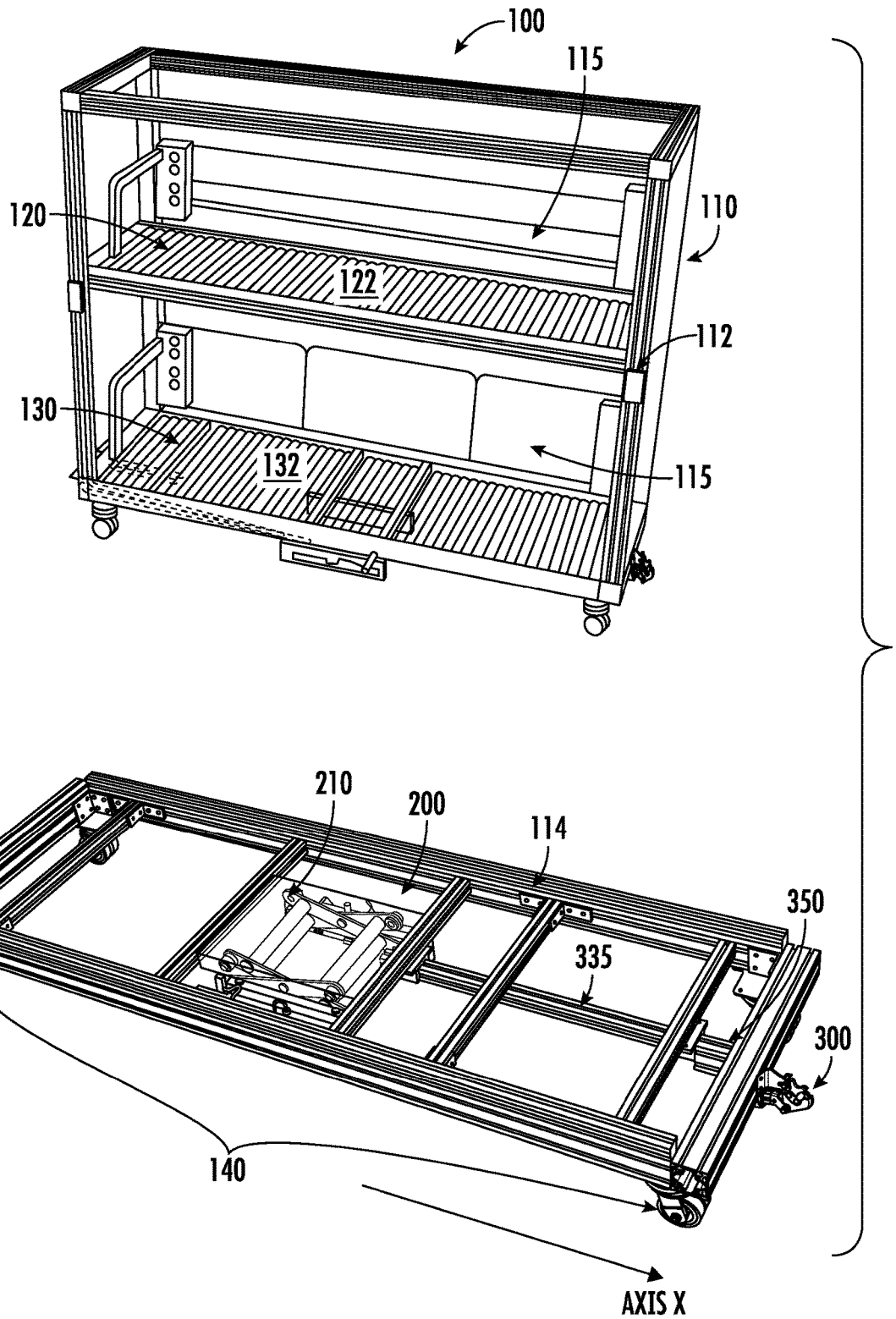
FIG. 1 is a perspective view of a cargo device, according to various embodiments.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

"One or more" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting." depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

According to one or more embodiments, a cargo device includes a cargo storage compartment defining a cavity for receiving cargo therein, and a cassette mounted to the cargo storage compartment by a lifting feature, with the cassette being movable via the lifting feature between a locked position engaging a track and an unlocked position disengaged from the track. The cargo device also includes a latch mechanism operably connected to the cassette, with the latch mechanism being movable between an engaged state securing the cargo storage compartment within a vehicle cargo space, and a disengaged state released from the vehicle cargo space. Upon the latch mechanism being in the engaged state, the lifting feature is actuated to move the cassette into the locked position.

Generally, the cargo device having at least one cassette for engagement with a track in a surface and/or wall in a vehicle, and a latch mechanism for securing the cargo device within the vehicle is provided. The cargo device may be any suitable structure with a cavity defined in a cargo storage compartment such that the cargo device is used for transporting, managing, loading or unloading cargo such as packages, goods or any suitable items, and also be used for storing cargo on board the vehicle. The cassette of the cargo device may further serve as an electrical contact for data communication or power transfer to the cargo device or to cargo on board the cargo device via its engagement with the surface and/or wall. The latch mechanism is allows the cargo storage compartment to be securable within a cargo space of the vehicle, and various non-limiting examples of the latch mechanism are described herein. The latch mechanism further may be configured to engage the cassette to move the cassette from the unlocked to locked position, and vice versa.

FIG. 1 shows an example of a cargo device 100, according to at least one embodiment. The cargo device 100 may include a cargo storage compartment 110 formed via a frame structure 112, defining a cavity 115 for receiving cargo within the cargo storage compartment 110. The frame structure 112 on the cargo device 100 may be any suitable structure, including, but not limited to, an open structure (for example, as shown in FIG. 1, or an enclosed structure with doors or a removable cover. The cargo device 100 may include platforms 120, 130 with respective top surfaces 122, 132 for supporting cargo thereon within the cavity 115. However, other configurations for the cargo storage compartment 110 of the cargo device 100 are contemplated, and the depiction of a frame structure 112 and platforms 120, 130 is not intended to be limiting.

The cargo storage compartment 110 includes a bottom frame 114, connected to the frame structure 112. In the embodiment depicted in FIG. 1, the bottom frame 114 includes one or more wheels 140 attached thereto for moving the cargo device 100 across a surface by rotation of the wheels 140. However, other suitable mechanisms may be used to move the cargo device 100 inside or outside the vehicle. For example, in other embodiments the cargo device 100 may be supported in a track system, suspended in a hanging system, be movable by sliding, or be transported by any suitable mechanism for moving the cargo device, and the depiction of wheels on the cargo device 100 is not intended to be limiting. In embodiments where the cargo device 100 includes wheels 140, the wheels 140 may be in mechanical communication with one or more motors for rotating the wheels 140 to propel the cargo device 100, or, in other embodiments, the wheels 140 may be manually rotated via pushing of the cargo storage compartment 110. In one or more embodiments, the wheels 140 may be selectively rotated by either a motor or manually, as based on an operator selection. The wheels 140 may be configured to transport the cargo device 100 in a single direction, two directions, multiple directions or in any direction.

Figure 2:
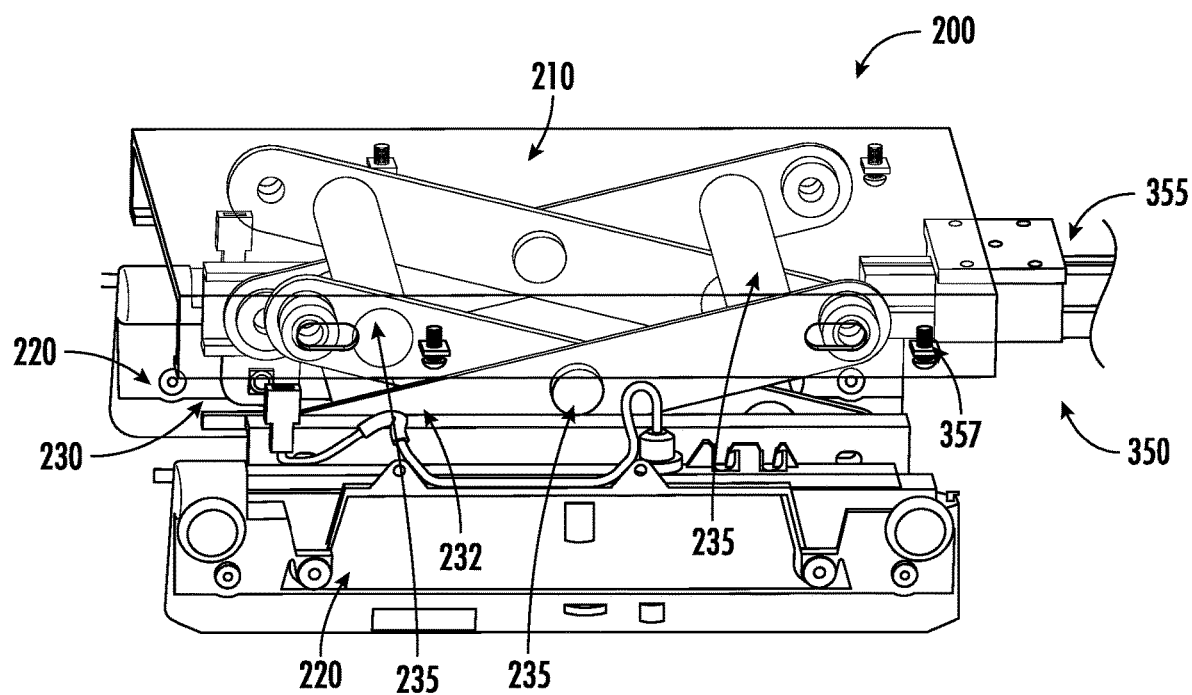
FIG. 2 is a perspective view of a cassette for a cargo device, according to at least one embodiment.

Referring again to FIG. 1, and shown in further detail in FIG. 2, the cargo device 100 also includes, in at least one embodiment, at least one cassette 200. Hereinafter the cargo device 100 will be discussed as having a cassette 200, however, this is not intended to be limiting and any number of cassettes based on the desired connection and/or design of the cargo storage compartment is contemplated. In the example shown in FIG. 1, the cassette 200 is located on the bottom of the cargo storage compartment 110 and operably secured with the bottom frame 114. Generally, the cassette 200 is not particularly limited to any mounting location on the cargo device, shape, size as long as the cassette is suitable for mechanical engagement and/or electrical communication with a track. As such, although shown on the bottom frame 114, the cassette 200 may be on any suitable portion of the cargo device (e.g., on the frame structure 112).

Furthermore, a single cassette 200 may engage a single track, a cassette 200 may engage with one or more tracks, for example, one cassette 200 may engage with two separate track simultaneously, and the discussion of a single cassette 200 with a single track is not intended to be limiting.

Figure 3:
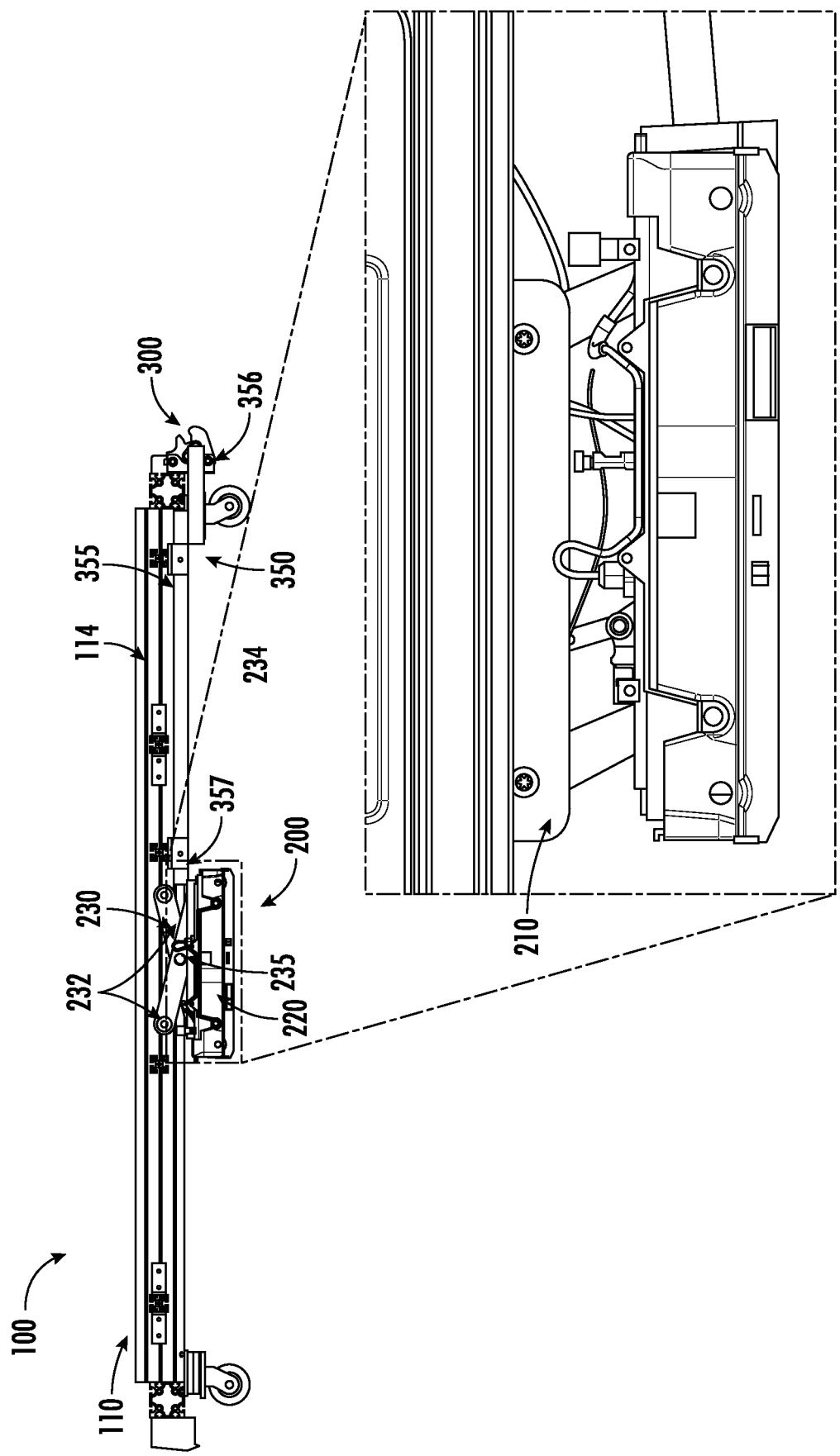
FIG. 3 is a partial side view of the cargo device of FIG. 1 with the cassette locked.
Figure 4:
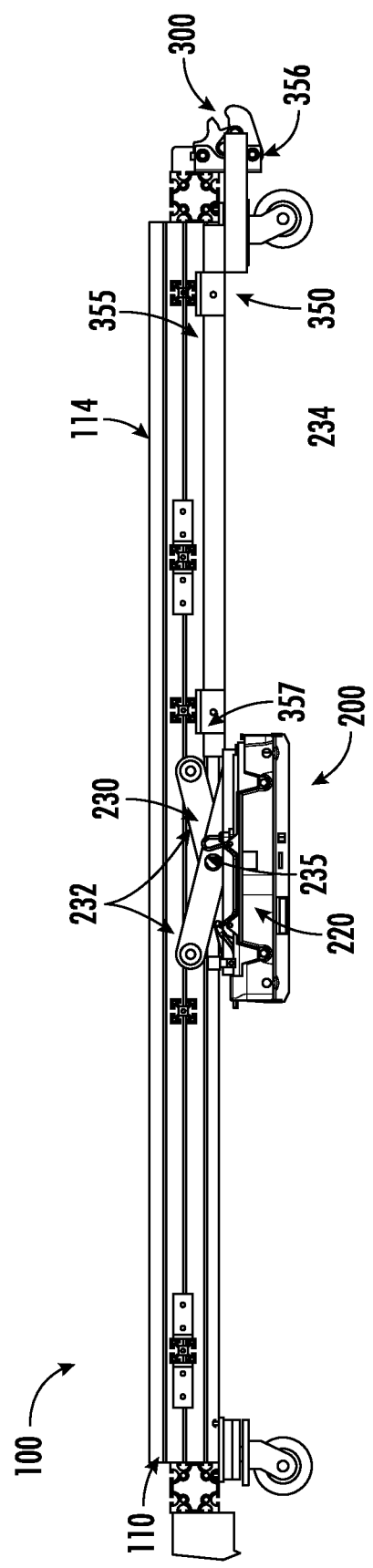
FIG. 4 is a partial side view of the cargo device of FIG. 3 with the cassette unlocked.

As shown in FIG. 2, the cassette 200 may include a base member 210 and engagement members 220 that are movable relative to the base member via a lifting feature 230 such that the cassette can be in a locked state as shown in FIG. 3, with the lifting feature 230 extending the cassette to engage with the track, or an unlocked state, as shown in FIG. 4, disengaged with/retracted from the track or stowed with the cargo device 100. As shown in the example of FIGS. 2-4, the lifting feature 230 may be a scissor lift that includes crossed members 232 and cross bars 234, with the crossed members having a pivot point 235 such that movement of the crossed members 232 moves the engagement members 220 relative to the base member 210. Although two engagement members 220 are shown engaged with the lifting feature 230, any suitable number (i.e., one or more) engagement members 220 may be included on the cassette 200 as based on the design of the tracks the cassette cooperates with. Moreover, although a scissor lift is described, the present disclosure is not intended to be limiting, and multi-bar linkages that can promote movement of the cassette 200 relative to the cargo storage compartment 110 is contemplated. The cassette 200 (via engagement members 220) may mechanically or magnetically couple with the tracks (not shown), via a magnetic or electromagnetic coupling, or via interference, transition, or clearance fit of the engagement members 220 with the track.

As shown in FIGS. 3-4, the lifting feature 230 allows for the engagement members 220 of the cassette to have a locked state (where the cassette 200 is connected with a track) and an unlocked state (where the cassette 200 is stowed with the cargo device 100 or retracted or disconnected from the track). In the locked state, the lifting feature 230 increases the distance of the engaging members 220 from the bottom frame 114 as compared with the unlocked state where the engaging members 220 are closer to the bottom frame 114 (i.e., stowed). Although the reference to the engagement members 220 being moveable is described herein, generally, the lifting feature 230 allows for movement of the cassette 200 between the locked state and the unlocked state, as shown in FIGS. 3-4, and discussion of specific members being movable is not intended to be limiting, and is described as an example of how the features of the cassette are configured when the cassette is in the locked and unlocked state with the tracks. For example, the lifting mechanism 230 may move a separate body that locks the engagement members 220 with the track, or the body itself may engage the track, and thus the depiction of FIGS. 2-4 is not intended to be limiting.

Generally, when locked with the track, as shown in FIG. 3, the cassette 200 may be mechanically or magnetically coupled to secure the cargo device 100 with the track in a vehicle, and may further provide an electrical connection for conveying electrical power or, in some embodiments, digital information or interchangeably, data related to and from the cargo device, the cargo storage compartment 110, or cargo loaded on the cargo device 100. Thus, the cassette 200 can facilitate electrical communication between the cargo device 100 and a cargo management system or the vehicle, such that the cassette may provide a mechanism for transfer of and/or receipt of digital data or information such as instructions from a controller, or logistical, locational, temperature environment data, or other information as related to the cargo and/or the cargo device 100. The electrical communication may also, or alternatively, be used to power the cargo device 100 such that when the cargo device 100 is in the transport mode, the cargo storage compartment 110 can be propelled via the wheels 140, and in some embodiments, movement of the cargo device 100 may be based on the digital information such that the cargo is transported a first location to a second location. Engagement of the cassette 200 may also be used to charge a battery (not shown) of the cargo device 100 such that the battery supplies power to the various features of the cargo device 100. Other suitable features may also be connected via the cassette, and the examples provided herein are not intended to be limiting.

As shown in FIGS. 1-4, and will be described in further detail with specific reference in the examples shown in FIGS. 5A-C, 6A-C, 7A-D, and 8A-C, the cargo device 100 further includes a latch mechanism 300. The latch mechanism 300 may be mounted on the bottom frame 114, as shown in the Figures, or may be on any suitable part of the cargo device 100 (such as, for example, the frame structure 112 of the cargo storage compartment 110) to secure the cargo storage compartment 110 within a vehicle cargo space.

The latch mechanism 300 is operably connected to the cassette 200. In certain embodiments, as shown in FIGS. 1-3, and will be described in further detail in the specific examples shown in FIGS. 5A-8C, the latch mechanism 300 is operably connected to the cassette 200 via a slider mechanism 350 that slides relative to the cargo storage compartment 110 (and/or bottom frame 114) to contact and actuate the lifting feature 230 of the cassette. For example, the slider mechanism 350 includes a slider bar 355 having a first end 356 towards the latch mechanism 300 and a second end 357, opposite to the first end 356, towards the cassette 200, with the slider bar 355 being movable in a forward and aft direction (as indicated as the axis X in the Figures). The latch mechanism 300 actuates the slider bar 355 at the first end 356 upon engagement (i.e., upon securing into the engaged state), such that the second end 357 actuates the lifting feature 230. In certain examples, where the lifting feature 230 may be a scissor lift, the second end 357 may contact a cross bar 234 to move the cross members 232 relative to the pivot point 235 and move the engagement members 220 relative to the base member 210 to move the cassette 200 to the locked state. As such, the latch mechanism 300 is operably connected to the cassette 200, with the latch mechanism 300 being movable between an engaged state securing the cargo storage compartment 110 within a vehicle cargo space, and a disengaged state released from the vehicle cargo space, and upon the latch mechanism 300 being in the engaged state, the lifting feature 230 can be actuated to move the cassette 200 into the locked position. Although described generally herein with respect to latch mechanism 300, specific latch securing sequences, and subsequent cassette locking, will be described in detail with respect to the examples shown for the latch mechanism 300 in FIGS. 5A-8C.

Generally, the latch mechanism 300 can be released to disengage the cargo device 100 from the vehicle cargo space. The latch mechanism 300 may be released via any suitable actuation, such as manual or automated actuation, and by any suitable mechanism, such as, but not limited to, a handle (e.g., handle rotation), cable (e.g., power cable release movement or manual or mechanical cable release), or other mechanical or hydraulic mechanism. Although described generally herein with respect to latch mechanism 300, specific latch releasing sequences, and subsequent cassette unlocking, will be described in detail with respect to the examples shown for the latch mechanism 300 in FIGS. 5A-8C.

However, although specific sequences are described for particular examples of latch mechanisms 300 that actuate the lifting feature 230 to move the cassette 200 to/from the locked state, in certain embodiments, in addition to the locked state (where the cargo device 100 is engaged with the track via the cassette 200), and the unlocked state (where the cargo device 100 is retracted from the track and disengaged from the track via the cassette 200), in at least one example, the cargo device 100 has an intermediate mode where the cassette 200 may be engaged with the track, but the latch mechanism 300 may be disengaged, such that the cargo device is not secured with the vehicle but data communication or power transfer may still occur through the cassette 200. Generally, this intermediate state may be achieved upon manual engagement or disengagement of the latch feature separate from a mechanical feature of the vehicle activating the latch mechanism. As such, the lifting feature 230 may be independently actuatable from the latch mechanism, and discussion of cooperation between the latch mechanism and lifting feature is related to certain embodiments, and is not intended to be limiting.

Figure 5A:
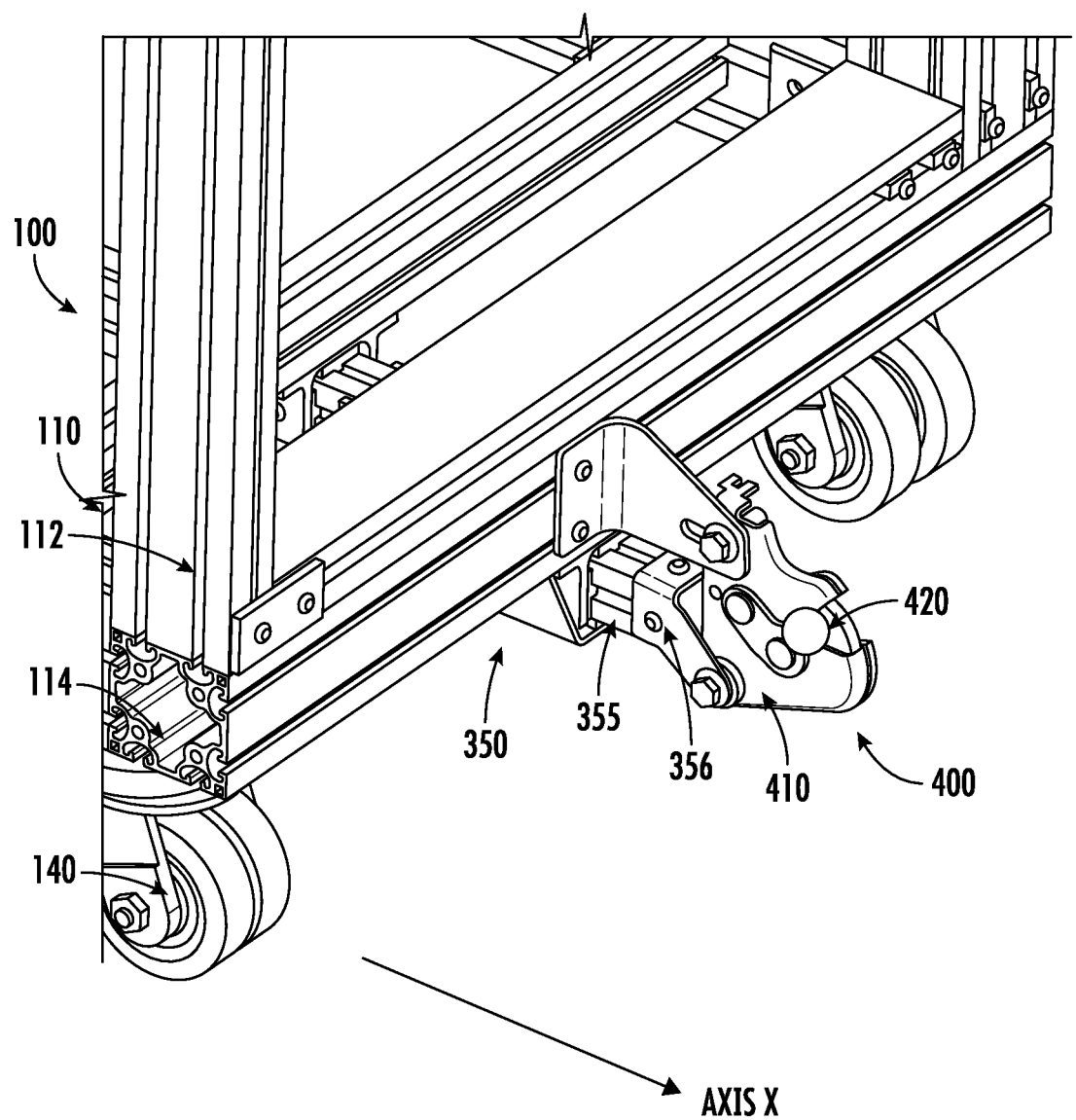
FIG. 5A is a partial perspective view of a latch mechanism for a cargo device according to an embodiment.
Figure 5B:
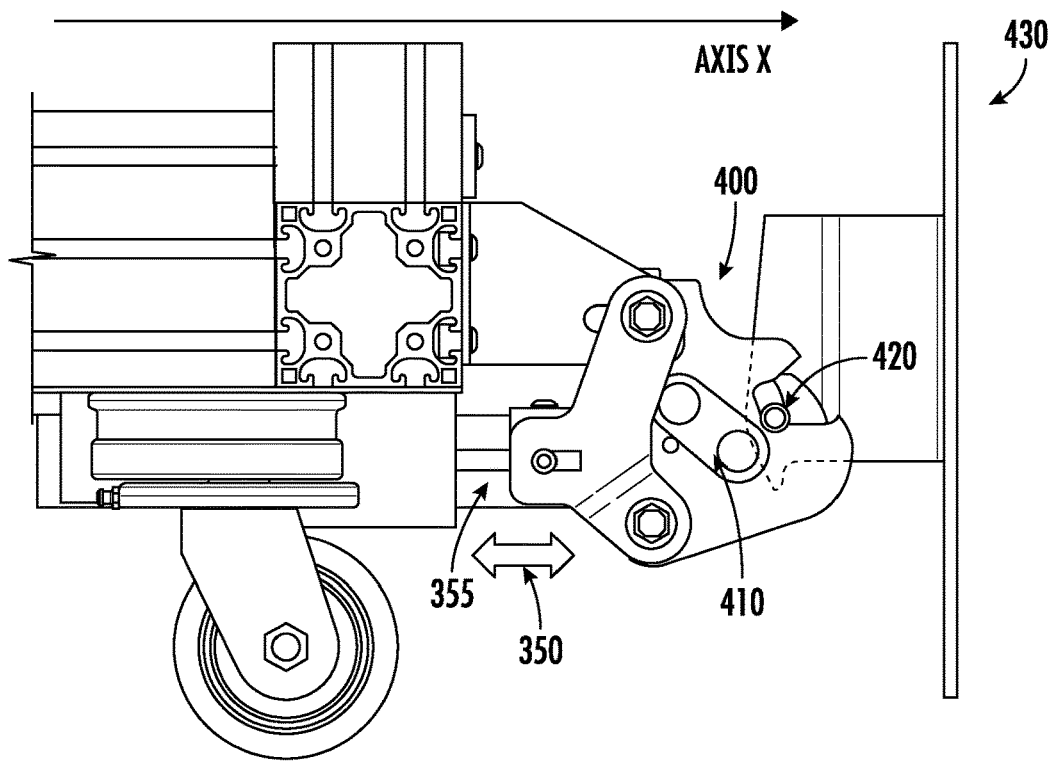
FIG. 5B is a partial side view of the latch mechanism of FIG. 5A, with a slider mechanism in a first position.
Figure 5C:
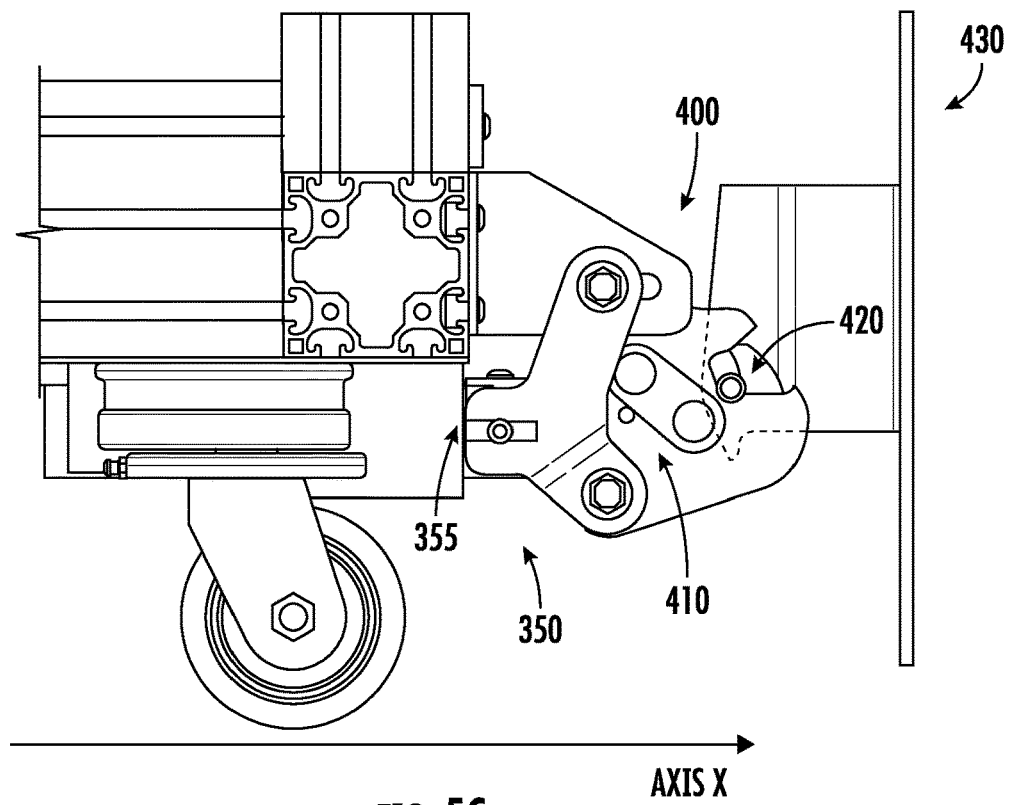
FIG. 5C is a partial side view of the latch mechanism of FIG. 5B, with the latch secured and the slider mechanism in a second position.

With reference to FIGS. 5A-C, an example of a latch mechanism 400 is provided. Latch mechanism 400, as shown in FIG. 5A, generally has the features, configuration, and operability as described with respect to FIGS. 1-4 and latch mechanism 300, with this particular example providing additional features of the latch itself for securing the cargo device 100 within the vehicle cargo space, and a sequence of locking and unlocking the cassette 200 via engagement and release of the latch mechanism 400. As shown in FIG. 5A, the latch mechanism 400 includes a latch body 410 mounted on the cargo storage compartment 110 (e.g., on the bottom frame 114) cooperable with a striker 420 mounted within the vehicle cargo space, for example, at a wall 430. The latch body 410 is connected to and/or engaged with the slider mechanism 350 at the first end 356 of the slider bar 355. Upon contact of the striker 420 with the latch body 410, the striker rod 420 is secured within the latch body 410, as shown in FIG. 5B. As the striker 420 is housed in the latch body 410 (i.e., via further movement towards the striker 420 of the cargo storage compartment 110, as shown in FIG. 5C), the latch body 410 moves the slider bar 355 towards the lifting feature 230 to actuate the lifting feature 230 and move the cassette 200 to the locked state. Although described in sequence, the connection between the latch body 410 and striker 420 may be generally simultaneously with the movement of the slider bar 355 based on contact between the striker 420 and the latch body 410. As such, the latch mechanism 400 is operably connected to the cassette 200, with the latch mechanism 400 being movable between an engaged state securing the cargo storage compartment 110 within a vehicle cargo space (e.g., via the striker 420 housed within the latch body 410), and a disengaged state released from the vehicle cargo space (e.g., the striker 420 removed from the latch body 410), and upon the latch mechanism 400 being in the engaged state, the lifting feature 230 can be actuated, e.g., by movement of the latch body 410 to push the slider mechanism 350, to move the cassette 200 to the locked position.

With reference to the example shown in FIGS. 5A-C, an example of an unlocking sequence for the cargo device 100 with the latch mechanism 400 is provided. Generally, the latch mechanism 400 can be released by any suitable release mechanism, for example, by handle rotation or power actuator cable travel. The release mechanism may be partially activated to release the striker 420 from the latch body 410 (for example, about 40 degree rotation of a handle). To release the cassette 200 from the track, the release mechanism can be fully activated. For example, where handle rotation is the release mechanism, the handle may be rotated about 60 degrees. In other examples, a lost motion cable can be used to coordinate the release steps. However, additional unsequenced release mechanisms may be contemplated, such as the cassette 200 being separately stowable without relation to the latch mechanism 400 being released, and the description of the above examples is not intended to be limiting.

Figure 6A:
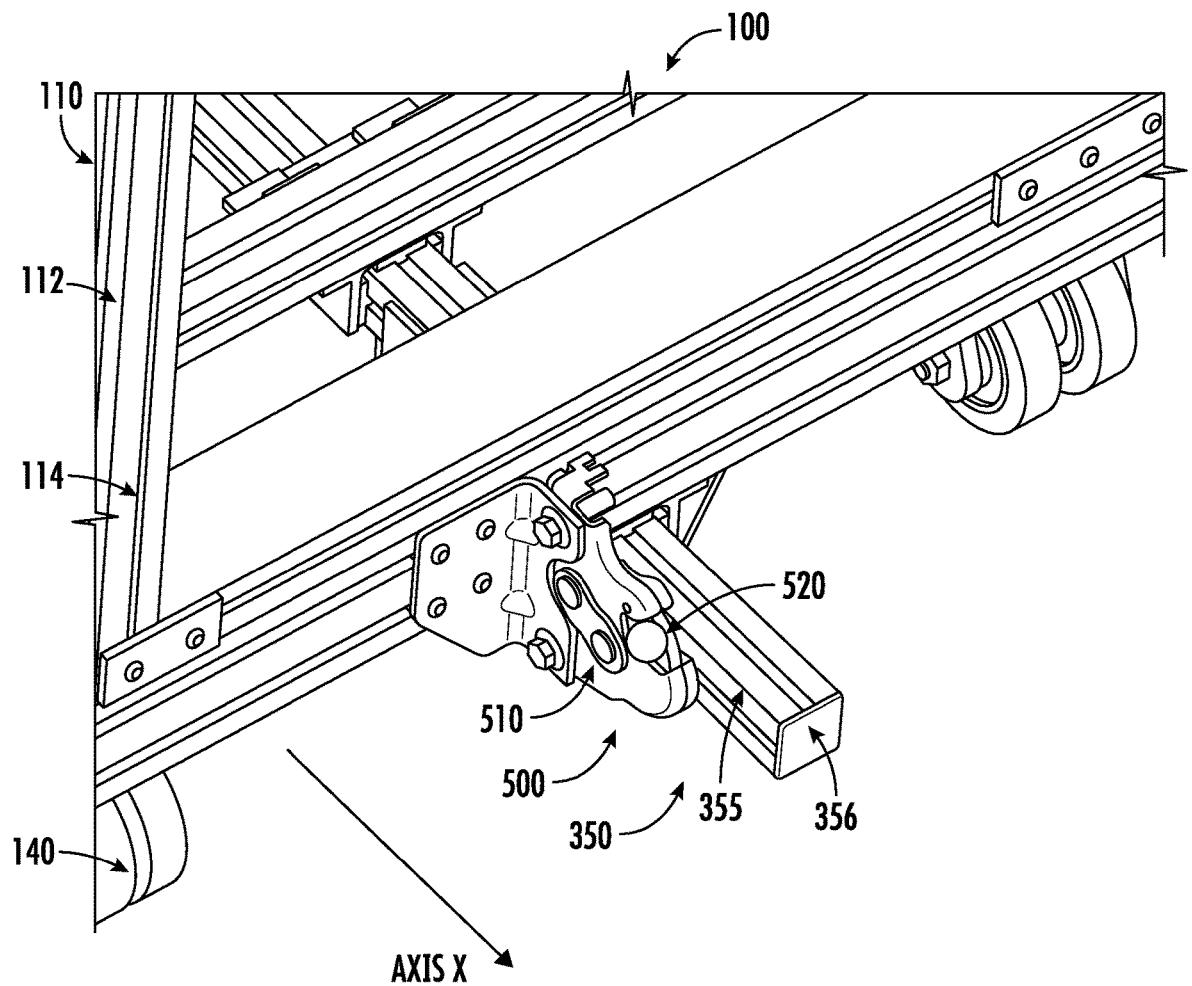
FIG. 6A is a partial perspective view of a latch mechanism for a cargo device according to another embodiment.
Figure 6B:
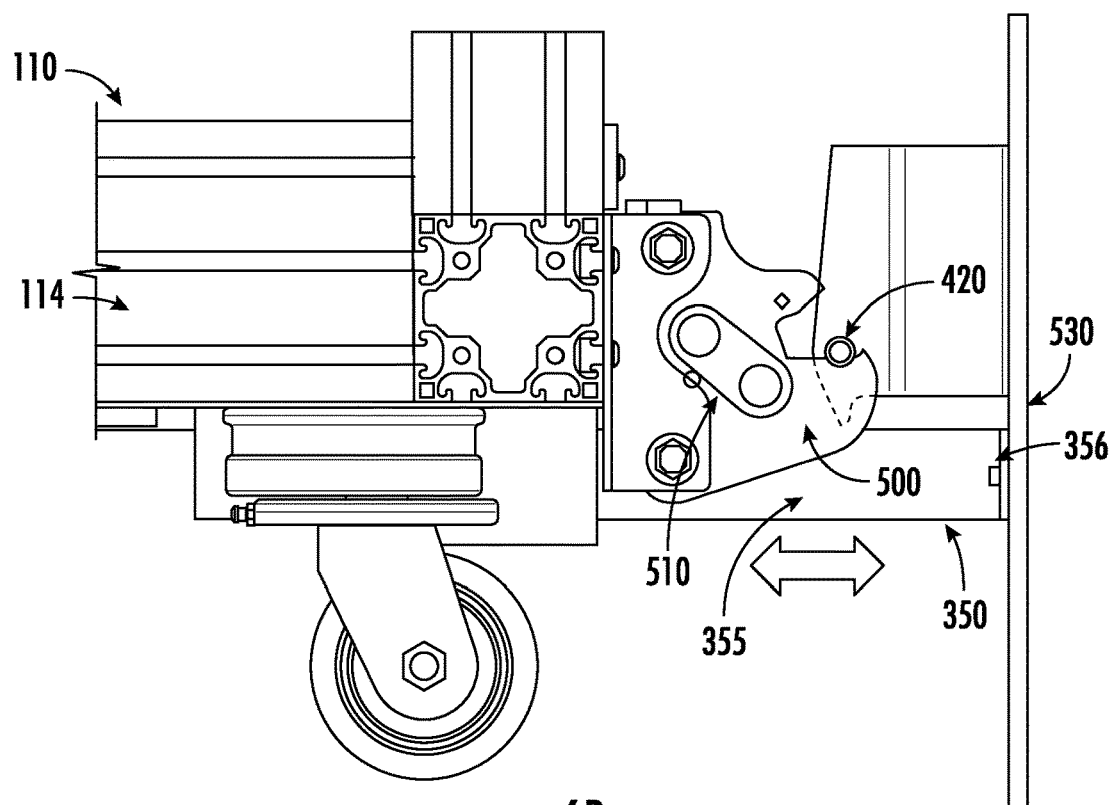
FIG. 6B is a partial side view of the latch mechanism of FIG. 6A, with a slider mechanism in a first position.
Figure 6C:
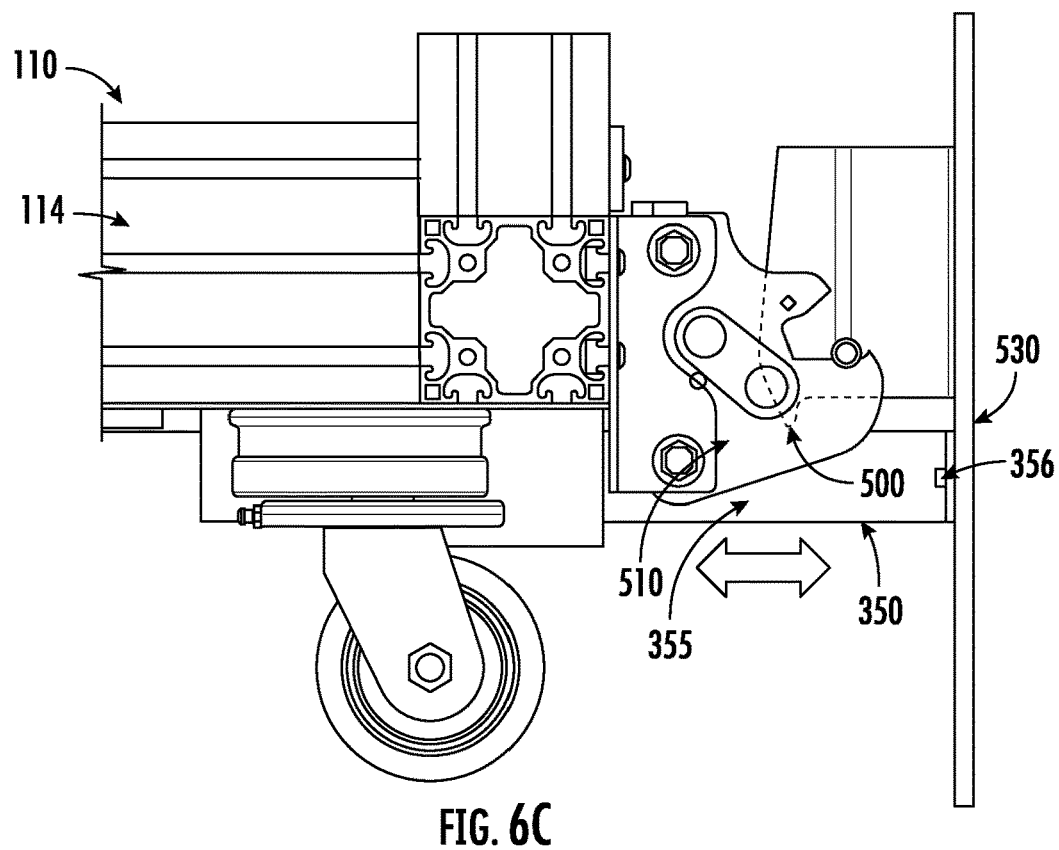
FIG. 6C is a partial side view of the latch mechanism of FIG. 6B, with the latch secured and the slider mechanism in a second position.

With reference to FIGS. 6A-C, an example of a latch mechanism 500 is provided. Latch mechanism 500, as shown in FIG. 6A, generally has the features, configuration, and operability as described with respect to FIGS. 1-4 and latch mechanism 300, with this particular example providing additional features of the latch itself for securing the cargo device 100 within the vehicle cargo space, and a sequence of locking and unlocking the cassette 200 via engagement and release of the latch mechanism 500.

As shown in FIG. 6A, the latch mechanism 500 includes a latch body 510 mounted on the cargo storage compartment 110 (e.g., on the bottom frame 114), cooperable with a striker 520 mounted within the vehicle cargo space (not shown). The latch body 510 is disconnected from the slider mechanism 350. Generally, the slider mechanism 350 is exposed at the first end 356 of the slider bar 355, such that the slider bar 355 can directly contact a wall 530 or feature in the vehicle cargo area. As such, in certain examples, like shown in FIG. 6A-C, the first end 356 may extend farther out from the bottom frame 114 than the latch body 510. The first end 356 may extend farther out a particular distance such that the latch body 510 can engage the striker 520 at about the same time the slider bar 355 contacts the wall 530 or feature of the vehicle cargo space. In other embodiments, the slider bar 355 may contact the wall 530 and slide prior to the latch body 510 engaging the striker 520. Although described herein as the slider mechanism 350 being actuated first, this is not intended to be limiting, and the features may simultaneously be activated, or activated in reverse, based on the specific construction of the cargo device 100.

Thus, upon contact of the wall 530 with the first end 356 of the slider bar 355, the slider bar 355 translates towards the lifting feature 230 such that the second end 357 actuates the lifting feature 230 and moves the cassette 200 to the locked state. Moreover, either simultaneously with, before or after the slider mechanism movement, contact of the striker 520 with the latch body 510 secures the striker rod 520 within the latch body 510, as shown in FIG. 6C to secure the cargo storage compartment 110 with the vehicle cargo space.

As such, the slider mechanism 350 cooperates with the vehicle cargo space, as the latch mechanism 500 also secures the cargo device with the vehicle cargo space, to move the cassette 200, with the latch mechanism 400 being movable between an engaged state securing the cargo storage compartment 110 within a vehicle cargo space (e.g., via the striker 520 housed within the latch body 510), and a disengaged state released from the vehicle cargo space (e.g., the striker 520 removed from the latch body 510), and upon the latch mechanism 400 being in the engaged state, the lifting feature 230 was be actuated, e.g., by movement of the slider mechanism 350 based on contact with the vehicle wall or feature, to move the cassette 200 to the locked position.

With reference to the example shown in FIGS. 6A-C, an example of an unlocking sequence for the cargo device 100 with the latch mechanism 500 is provided. Generally, the cassette 200 can be released by any suitable release mechanism, for example, by handle rotation or power actuator cable travel. The release mechanism may be partially activated to release the cassette 200 from the track (for example, about 40 degree rotation of a handle). To release striker 520 from the latch body 510, the release mechanism can be fully activated. For example, where handle rotation is the release mechanism, the handle may be rotated about 60 degrees. In other examples, a lost motion cable can be used to coordinate the release steps. However, additional release mechanisms and steps may be contemplated, such as the latch mechanism 500 being released prior to unlocking of the cassette 200, and the description of the above examples is not intended to be limiting.

Figure 7A:
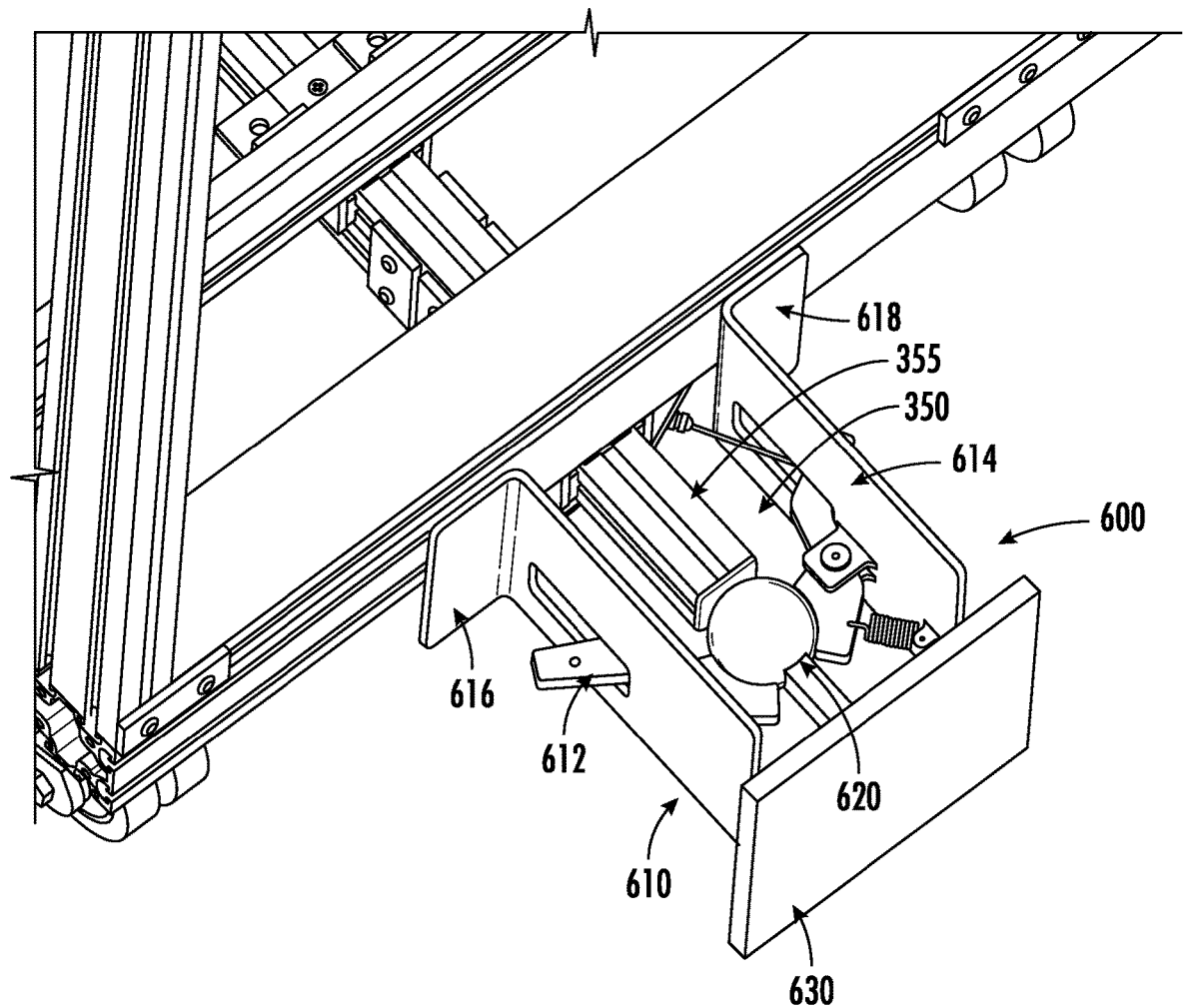
FIG. 7A is a partial perspective view of a latch mechanism for a cargo device according to another embodiment.

With reference to FIGS. 7A-D, an example of a latch mechanism 600 is provided. Latch mechanism 600, as shown in FIG. 7A, generally has the features, configuration, and operability as described with respect to FIGS. 1-4 and latch mechanism 300, with this particular example providing additional features of the latch itself for securing the cargo device 100 within the vehicle cargo space, and a sequence of locking and unlocking the cassette 200 via engagement and release of the latch mechanism 600. As shown in FIG. 7A, the latch mechanism 600 is generally a ball & finger system of locking, with all features and components generally included in this type of latching system. The latch mechanism 600 includes a finger body 610 mounted on the cargo storage compartment 110 (e.g., on the bottom frame 114) cooperable with a ball 620 mounted within the vehicle cargo space (i.e., on a wall 630). Although shown in this arrangement, it is contemplated that the ball 620 and finger body 610 may be reversed in their location in other embodiments, although not explicitly described herein, and follow the general nature of the latch mechanism 600 cooperating with the slider mechanism 350. As shown in FIG. 7B, the finger body 610 includes locking fingers 612, 614, which may be mounted on respective brackets 616, 618 on either side of the slider mechanism 350. Each locking finger 612, 614 has a shape such that upon the ball 620 entering the finger body 610, the locking fingers 612, 614 retain the ball 620 within the finger body 620. Upon the locking fingers 612, 614 contacting the ball 620 (as shown in FIG. 7B), and the ball 620 pushing past the locking fingers 612, 614 (resisting via spring force bias), the locking fingers 612, 614 will clamp onto the ball 620 via the spring force bias, as shown in FIG. 7C. The slider mechanism 350 has the slider bar 355 in a forward position the finger body 610 such that the first end 356 is exposed for contact with the ball 620. Upon entry of the ball 620 into the finger body 610, the ball 620 contacts the first end 356 of the slider bar 355 to translate the slider mechanism 350 rearward and actuate the lifting feature 230 (as shown in FIG. 7D) and move the cassette 200 to the locked state.

Although described in sequence, the clamping of the ball 620 may occur simultaneously with or after the slider mechanism 350, as based on the position of the slider bar 355 within the finger body 610. As such, the latch mechanism 600 is operably connected to the cassette 200, with the latch mechanism 600 being movable between an engaged state securing the cargo storage compartment 110 within a vehicle cargo space (e.g., via the ball 620 housed within the finger body 610), and a disengaged state released from the vehicle cargo space (e.g., the ball 620 removed from the finger body 610), and upon the latch mechanism 600 being in the engaged state, the lifting feature 230 can be actuated, e.g., by movement of the ball 620 to push the slider mechanism 350, to move the cassette 200 to the locked position.

With reference to the example shown in FIGS. 7A-D, an example of an unlocking sequence for the cargo device 100 with the latch mechanism 600 is provided. Generally, the cassette 200 can be released by any suitable release mechanism, for example, by one or more cables 640 that is actuated by release of the locking fingers 612, 614. That is, the unlocking and disengagement can be generally synchronized. The cable 640 is actuated via unlock of locking fingers 612, 614, such that the cable 640 moves the slider mechanism 350 to the forward position to actuate the lifting feature 230 to retract the cassette 200 to the unlocked position. However, additional release mechanisms and steps may be contemplated, such as the latch mechanism 600 being released after or before unlocking of the cassette 200, and the description of the above examples is not intended to be limiting.

Figure 8A:
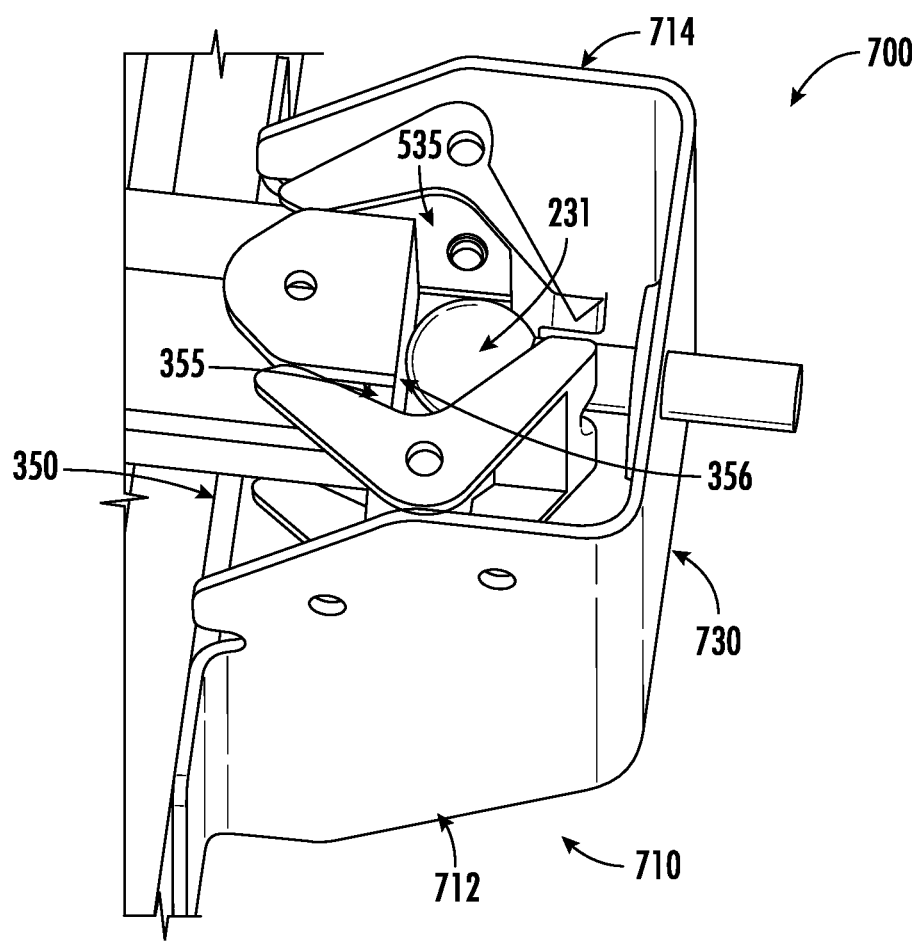
FIG. 8A is a partial perspective view of a latch mechanism for a cargo device according to another embodiment.
Figure 8B:
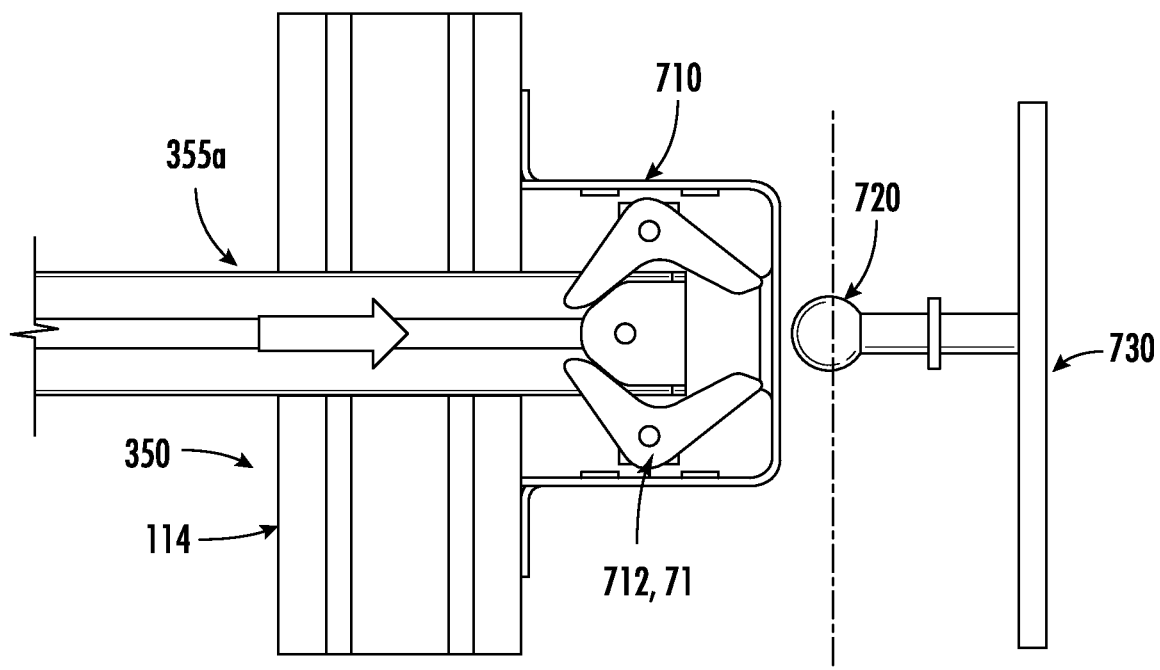
FIG. 8B is a partial top view of the latch mechanism of FIG. 8A, with a slider mechanism in a first position.
Figure 8C:
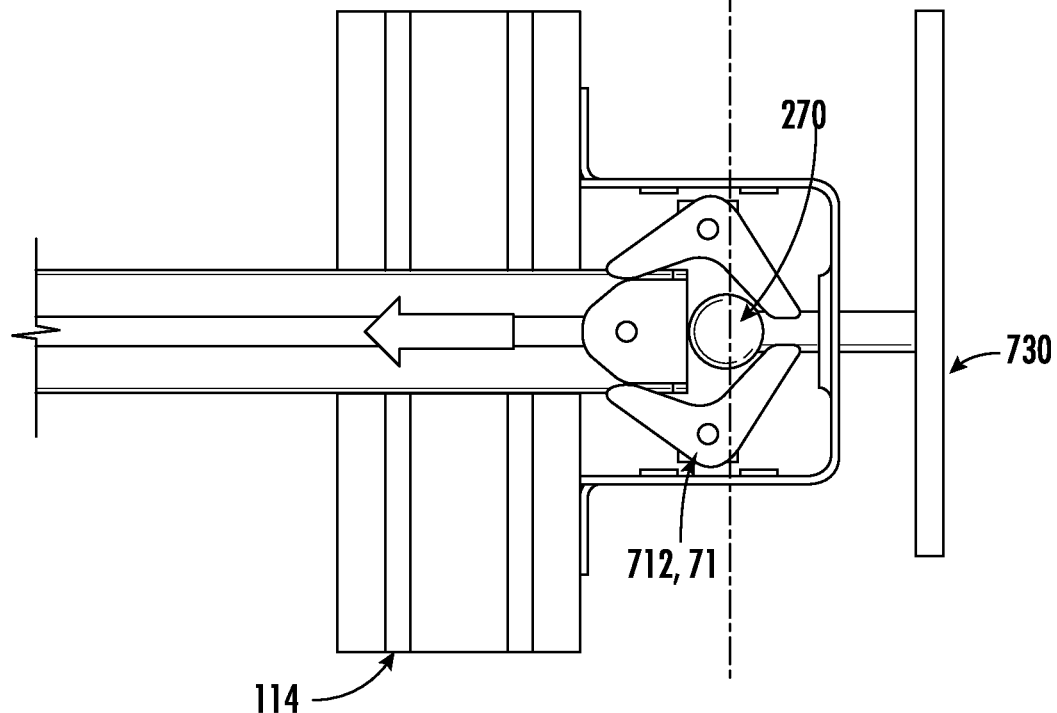
FIG. 8C is a partial top view of the latch mechanism of FIG. 8B, with the latch secured and the slider mechanism in a second position.

With reference to FIGS. 8A-C, an example of a latch mechanism 700 is provided. Latch mechanism 700, as shown in FIG. 8A, generally has the features, configuration, and operability as described with respect to FIGS. 1-4 and latch mechanism 300, with this particular example providing additional features of the latch itself for securing the cargo device 100 within the vehicle cargo space, and a sequence of locking and unlocking the cassette 200 via engagement and release of the latch mechanism 700. As shown in FIG. 8A, the latch mechanism 700 is generally a ball & finger system of locking, with all features and components generally included in this type of latching system. The latch mechanism 700 includes a finger body 710 mounted on the cargo storage compartment 110 (e.g., on the bottom frame 114) cooperable with a ball 720 mounted within the vehicle cargo space (e.g., on a wall 730). Although shown in this arrangement, it is contemplated that the ball 720 and finger body 710 may be reversed in their location in other embodiments, although not explicitly described herein, and follow the general nature of the latch mechanism 700 cooperating with the slider mechanism 350. As shown in FIG. 8B, the finger body 710 includes locking fingers 712, 714, which may be mounted on to the slider mechanism 350 and, optionally, to the bottom frame 114. Each locking finger 712, 714 has a shape such that upon latching of the ball 720 with the finger body 710, the locking fingers 712, 714 retain the ball 720 within the finger body 710. As shown in FIG. 8B, the slider mechanism is in a forward extended position, where the lifting feature 230 is not actuated such that the cassette 200 is in the unlocked state. As the cargo device 100 approaches the ball 720, the ball 720 enters the finger body 710 and contacts the slider mechanism 350 at the first end 356 of the slider bar 355 and moves the slider mechanism rearward relative to the first position, such that the slider mechanism 350 actuates the lifting feature 230 (e.g., by the second end 357 of the slider bar 355 contacting the cross bar 234) to move the cassette 200 to the locked position. Movement of the slider mechanism 350 to the second position allows the locking fingers 712, 714 to engage and lock with the ball 720, as shown in FIG. 8C. The locking fingers 712, 714 may be equipped with suitable springs to clamp onto the ball 720 to retain the ball 720 in the finger body 710.

Although described in sequence, the clamping of the ball 720 may occur simultaneously with contact of the slider mechanism 350, as based on the position of the slider bar 355 within the finger body 710. As such, the latch mechanism 700 is operably connected to the cassette 200, with the latch mechanism 700 being movable between an engaged state securing the cargo storage compartment 110 within a vehicle cargo space (e.g., via the ball 720 housed within the finger body 710), and a disengaged state released from the vehicle cargo space (e.g., the ball 720 removed from the finger body 710), and when the latch mechanism 700 is in the engaged state, the lifting feature 230 is actuated, e.g., by movement of the ball 720 to push the slider mechanism 350, to move the cassette 200 to the locked position.

With reference to the example shown in FIGS. 8A-C, any suitable unlocking sequence for the cargo device 100 with the latch mechanism 700 is contemplated, for example, as described previously. Generally, the cassette 200 can be released by any suitable release mechanism, for example, by a cable that is actuated by release of the locking fingers 712, 714. That is, the unlocking and disengagement can be generally synchronized. The cable may be actuated via unlock of locking fingers 712, 714, such that the cable moves the slider mechanism 350 to the forward position to actuate the lifting feature 230 to retract the cassette 200 to the unlocked position. However, additional release mechanisms and steps may be contemplated, such as the latch mechanism 700 being released after or before independent unlocking of the cassette 200, and the description of the above examples is not intended to be limiting.

According to at least one embodiment, the cargo device and vehicle with a cargo area are part of a cargo management system. As such, the cargo management system includes a vehicle cargo area with a track defined therein and at least one vehicle component at select locations in the vehicle cargo area. The cargo management system also includes at least one cargo device, with each cargo device including a cargo storage compartment defining a cavity therein for receiving cargo, and further comprising a cassette for engaging with the track. The cassette may be movable via a lifting feature between a locked position engaging the track and an unlocked position disengaged with the track. The cargo management system also includes a latch mechanism having an engaged state securing the cargo device with the a selected vehicle component of the at least one vehicle component at a selected location, and a disengaged state released from the selected vehicle component to allow movement of the cargo device within the vehicle cargo area to other selected locations. The at least one vehicle component provides a location for securing the latch mechanism, and may be a ball or striker as described in the examples herein. Upon engagement of the latch mechanism with the selected vehicle component, the latch mechanism is moved to the engaged state, and the lifting feature is actuated to move cassette to the locked position.

In at least one embodiment, a controller (not shown) may be incorporated in the cargo management system in wireless communication with the cargo device 100 via electronics located on the cargo device 100 for integrating the cargo device with the cargo management system. The controller may be in communication with the cargo device 100 by any suitable manner, such as but not limited to, WIFI, Bluetooth, a wire or other electrical communication and/or via the engagement between cassettes 200 and track. The controller may provide instructions or machine instructions for operating the cargo device 100 as based on the cargo management system. For example, the controller may provide instructions for actuating the lift feature 230 or releasing the latch mechanism as based on desired movement of the cargo device 100 within the vehicle cargo area (e.g., based on delivery location of the packages loaded thereon and ease of a delivery driver to access the particular cargo storage compartment with the cargo to be delivered). The controller may generally transfer of or receive logistical, locational, identifying or any other information about the cargo or cargo device 100 to or from the cargo device 100, and may be configured to receive information (e.g., logistical data or perishability data) from other sources such as a sorting machine, databases, the cargo itself, or other sources such as customer purchasing systems.

In at least one example, the cargo device 100 may be configured to specifically latch and lock based on the cargo management system being used to organize or sort cargo by various parameters such as order due date, geographical location, type of goods, etc. Thus, the controller may instruct the latch mechanism as based on data indicative of logistical details, location, due dates, etc., such that the cargo device 100 can be moved about the cargo area to a new location for locking.

In at least another example, the cargo device 100 may be configured to specifically coordinate or operate with the vehicle cargo area such that the vehicle can be efficiently loaded and various cargo storage compartments can be secured in the cargo area while other compartments are being unloaded or loaded.

Generally, although described as the lifting feature being actuated upon engagement of the latch mechanism, this is not intended to be limiting, as described in the examples herein, as the generally the state of each of the latch mechanism and the cassette may be coordinated in alternate sequences as based on the arrangement. However, the present disclosure relates to state where the cassette is locked while the latch mechanism is secured in the engaged state, and is not limited to any order of engagement and/or locking.

Thus, according to one or more embodiments, a cargo device is provided with a cargo storage compartment defining a cavity for receiving cargo therein, and a cassette mounted to the cargo storage compartment by a lifting feature, with the cassette being movable via the lifting feature between a locked position engaging a track and an unlocked position disengaged from the track. The cargo device includes a latch mechanism operably connected to the cassette, with the latch mechanism being movable between an engaged state securing the cargo storage compartment within a vehicle cargo space, and a disengaged state released from the vehicle cargo space. When the latch mechanism is in the engaged state, the lifting feature may be actuated to move the cassette into the locked position.

Aspect 1. A cargo device comprising a cargo storage compartment defining a cavity for receiving cargo therein; a cassette mounted to the cargo storage compartment by a lifting feature, the cassette being movable via the lifting feature between a locked position engaging a track and an unlocked position disengaged from the track; and a latch mechanism operably connected to the cassette, the latch mechanism being movable between an engaged state securing the cargo storage compartment within a vehicle cargo space, and a disengaged state released from the vehicle cargo space. Upon the latch mechanism being in the engaged state, the lifting feature is actuated to move the cassette into the locked position.

Aspect 2. The cargo device of aspect 1, wherein in the unlocked position, the cassette is removed relative to openings of the track.

Aspect 3. The cargo device of aspects 1 or 2, wherein the lifting feature is a scissor lift attached to the cassette on a first side of the scissor lift and to the cargo storage compartment on a second side of the scissor lift, opposite to the first side.

Aspect 4. The cargo device of aspect 3, wherein the scissor lift has an extended position corresponding to the locked state and a retracted position corresponding to the unlocked state.

Aspect 5. The cargo device of any of aspects 1 to 4, further comprising a slider movably secured to the cargo storage compartment and engageable with the latch mechanism and the cassette, wherein the slider actuates the lifting feature upon engagement of the slider by the latch mechanism.

Aspect 6. The cargo device of any of aspects 1 to 5, wherein upon release of the latch mechanism from the engaged state, the lifting feature is actuated to move the cassette into the unlocked position.

Aspect 7. The cargo device of any of aspects 1 to 6, further comprising a release mechanism operably connected to the latch mechanism and the cassette, the release mechanism being actuated upon disengagement of the latch mechanism from the engaged state such that the cassette is movable to the unlocked position.

Aspect 8. The cargo device of aspect 7, wherein the release mechanism is a power cable release or a rotatable handle connected to the latch mechanism for disengaging the latch mechanism from the engaged state.

Aspect 9. The cargo device of any of aspects 1 to 8, wherein the latch mechanism secures the cargo storage compartment at a selected location in the vehicle cargo space when in the engaged state for movement of the cassette.

Aspect 10. A cargo device comprises a cargo storage compartment defining a cavity for receiving cargo therein, the cargo storage compartment being selectively positioned within a vehicle cargo space via a cargo management system; a cassette mounted to the cargo storage compartment by a lifting feature, the cassette being movable via the lifting feature between a locked position engaging a track located in the vehicle cargo space, and an unlocked position disengaged from the track; and an actuator operably connected to the cassette via the lifting feature and engaging the lifting feature such that upon engagement of the actuator with a vehicle feature, the lifting feature is activated to move the cassette to the locked position.

Aspect 11. The cargo device of aspect 10, wherein the actuator is a slider movable between a forward position where the cassette is unlocked, and an aft position where the cassette is locked.

Aspect 12. The cargo device of aspects 10 or 11, further comprising a latch engageable with the actuator to secure and release the cassette in the locked position or unlocked position, respectively.

Aspect 13. The cargo device of aspect 12, wherein upon the actuator engaging the lifting feature, the latch secures the actuator such that the cassette is held in the locked position.

Aspect 14. The cargo device of aspects 12 or 13, wherein upon release of the latch from the actuator, the lifting feature is actuated to move the cassette into the unlocked position.

Aspect 15. The cargo device of any of aspects 10 to 14, wherein the lifting feature is a scissor lift attached to the cassette on a first side of the scissor lift and to the cargo storage compartment on a second side of the scissor lift, opposite to the first side.

Aspect 16. A cargo management system comprises a vehicle cargo area comprising a track defined therein and at least one vehicle component at select locations in the vehicle cargo area; at least one cargo device, each cargo device comprising a cargo storage compartment defining a cavity therein for receiving cargo, and further comprising a cassette for engaging with the track, the cassette being movable via a lifting feature between a locked position engaging the track and an unlocked position disengaged with the track; and a latch mechanism having an engaged state securing the cargo device with the a selected vehicle component of the at least one vehicle component at a selected location, and a disengaged state released from the selected vehicle component to allow movement of the cargo device within the vehicle cargo area to other selected locations. Upon engagement of the latch mechanism with the selected vehicle component, the latch mechanism is moved to the engaged state, and the lifting feature is actuated to move cassette to the locked position.

Aspect 17. The cargo management system of aspect 16, wherein the lifting feature is a scissor lift attached to the cassette on a first side of the scissor lift and to the cargo device on a second side of the scissor lift, opposite to the first side.

Aspect 18. The cargo management system of aspects 16 or 17, wherein upon release of the latch mechanism from the engaged state, the latch mechanism is moved to the disengaged state, and the lifting feature is actuated to move the cassette into the unlocked position.

Aspect 19. The cargo management system of any of aspects 16 to 18, further comprising a slider movably secured to the cargo device and engageable with the latch mechanism and the cassette, wherein the slider actuates the lifting feature upon engagement of the latch mechanism with the selected vehicle component.

Aspect 20. The cargo management system of any of aspects 16 to 19, further comprising a release mechanism operably connected to the latch mechanism and the cassette, the release mechanism being actuated upon disengagement of the latch mechanism from the engaged state such that the cassette is movable to the unlocked position.

Further aspects are also contemplated, consistent with the above disclosed embodiments and their combinations.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. A cargo device comprising:
    a cargo storage compartment defining a cavity for receiving cargo therein;
    a cassette mounted to the cargo storage compartment by a lifting feature, the cassette being movable via the lifting feature between a locked position engaging a track and an unlocked position disengaged from the track; and
    a latch mechanism operably connected to the cassette, the latch mechanism being movable between an engaged state securing the cargo storage compartment within a vehicle cargo space, and a disengaged state released from the vehicle cargo space,
    wherein upon the latch mechanism being in the engaged state, the lifting feature is actuated to move the cassette into the locked position.

2. The cargo device of claim 1, wherein in the unlocked position, the cassette is removed relative to openings of the track.

3. The cargo device of claim 1, wherein the lifting feature is a scissor lift attached to the cassette on a first side of the scissor lift and to the cargo storage compartment on a second side of the scissor lift, opposite to the first side.

4. The cargo device of claim 3, wherein the scissor lift has an extended position corresponding to the locked position and a retracted position corresponding to the unlocked position.

5. The cargo device of claim 1, further comprising a slider movably secured to the cargo storage compartment and engageable with the latch mechanism and the cassette, wherein the slider actuates the lifting feature upon engagement of the slider by the latch mechanism.

6. The cargo device of claim 1, wherein upon release of the latch mechanism from the engaged state, the lifting feature is actuated to move the cassette into the unlocked position.

7. The cargo device of claim 6, further comprising a release mechanism operably connected to the latch mechanism and the cassette, the release mechanism being actuated upon disengagement of the latch mechanism from the engaged state to actuate the lifting feature to move the cassette to the unlocked position.

8. The cargo device of claim 7, wherein the release mechanism is a cable or a handle connected to the latch mechanism for disengaging the latch mechanism from the engaged state.

9. The cargo device of claim 1, wherein the latch mechanism secures the cargo storage compartment at a selected location in the vehicle cargo space when in the engaged state for movement of the cassette.

10. A cargo device comprising:
    a cargo storage compartment defining a cavity for receiving cargo therein, the cargo storage compartment being selectively positioned within a vehicle cargo space via a cargo management system;
    a cassette mounted to the cargo storage compartment by a lifting feature, the cassette being movable via the lifting feature between a locked position engaging a track located in the vehicle cargo space, and an unlocked position disengaged from the track; and
    an actuator operably connected to the cassette via the lifting feature and engaging the lifting feature such that upon engagement of the actuator with a vehicle feature, the lifting feature is activated to move the cassette to the locked position.

11. The cargo device of claim 10, wherein the actuator is a slider movable between a forward position where the cassette is unlocked, and an aft position where the cassette is locked.

12. The cargo device of claim 10, further comprising a latch engageable with the actuator to secure and release the cassette in the locked position or unlocked position, respectively.

13. The cargo device of claim 12, wherein upon the actuator engaging the lifting feature, the latch secures the actuator such that the cassette is held in the locked position.

14. The cargo device of claim 12, wherein upon release of the latch from the actuator, the lifting feature is actuated to move the cassette into the unlocked position.

15. The cargo device of claim 10, wherein the lifting feature is a scissor lift attached to the cassette on a first side of the scissor lift and to the cargo storage compartment on a second side of the scissor lift, opposite to the first side.

16. A cargo management system comprising:
a vehicle cargo area comprising a track defined therein and at least one vehicle component at select locations in the vehicle cargo area;
at least one cargo device, each cargo device comprising a cargo storage compartment defining a cavity therein for receiving cargo, and further comprising a cassette for engaging with the track, the cassette being movable via a lifting feature between a locked position engaging the track and an unlocked position disengaged with the track; and
a latch mechanism having an engaged state securing the cargo device with the a selected vehicle component of the at least one vehicle component at a selected location, and a disengaged state released from the selected vehicle component to allow movement of the cargo device within the vehicle cargo area to other selected locations,
wherein upon engagement of the latch mechanism with the selected vehicle component, the latch mechanism is moved to the engaged state, and the lifting feature is actuated to move cassette to the locked position.

17. The cargo management system of claim 16, wherein the lifting feature is a scissor lift attached to the cassette on a first side of the scissor lift and to the cargo device on a second side of the scissor lift, opposite to the first side.

18. The cargo management system of claim 16, wherein upon release of the latch mechanism from the engaged state, the latch mechanism is moved to the disengaged state, and the lifting feature is actuated to move the cassette into the unlocked position.

19. The cargo management system of claim 16, further comprising a slider movably secured to the cargo device and engageable with the latch mechanism and the cassette, wherein the slider actuates the lifting feature upon engagement of the latch mechanism with the selected vehicle component.

20. The cargo management system of claim 16, further comprising a release mechanism operably connected to the latch mechanism and the cassette, the release mechanism being actuated upon disengagement of the latch mechanism from the engaged state such that the cassette is movable to the unlocked position.

* * * * *